US010335862B2

United States Patent
Breisch et al.

(10) Patent No.: US 10,335,862 B2
(45) Date of Patent: Jul. 2, 2019

(54) TOOL BODY AND A TURNING TOOL FOR GROOVING OPERATIONS

(71) Applicant: SANDVIK INTELLECTUAL PROPERTY AB, Sandviken (SE)

(72) Inventors: Anders Breisch, Sandviken (SE); Johan Anderstedt, Sandviken (SE); Peter Blom, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 15/760,184

(22) PCT Filed: Jun. 28, 2016

(86) PCT No.: PCT/EP2016/064903
§ 371 (c)(1),
(2) Date: Mar. 14, 2018

(87) PCT Pub. No.: WO2017/045790
PCT Pub. Date: Mar. 23, 2017

(65) Prior Publication Data
US 2019/0047057 A1    Feb. 14, 2019

(30) Foreign Application Priority Data

Sep. 15, 2015  (EP) .................................... 15185226

(51) Int. Cl.
*B23B 29/00* (2006.01)
*B23B 29/04* (2006.01)

(52) U.S. Cl.
CPC ........ *B23B 29/043* (2013.01); *B23B 2205/02* (2013.01); *B23B 2220/126* (2013.01)

(58) Field of Classification Search
CPC ... B23B 29/04; B23B 29/043; B23B 2205/02; B23B 2205/04; B23B 2205/10;
(Continued)

(56) References Cited

U.S. PATENT DOCUMENTS 2,296,597 A * 9/1942 Carr ........................ B23B 29/04
407/112
3,125,798 A * 3/1964 Stein ....................... B23B 27/04
407/83

(Continued)

FOREIGN PATENT DOCUMENTS

| EP | 0767023 A1 | 4/1997 |
| EP | 2703104 A1 | 3/2014 |
| JP | 2010179380 A | 8/2010 |

*Primary Examiner* — Willmon Fridie, Jr.
(74) *Attorney, Agent, or Firm* — Corinne R. Gorski

(57) ABSTRACT

A tool body and a turning tool for grooving operations having the tool body include a fitting member extending along a longitudinal first axis for fixing the tool body to a machine. The tool body's upper and lower clamping members each having respective inner seating surfaces facing one another and separated by an intermediate gap in which a cutting insert is insertable. A major part of the lower inner seating surface extends along a second axis perpendicular to the first axis. The clamping members are movable toward one another by a tightening device in order to secure the cutting insert in the intermediate gap. The tool body is integrally formed in a unitary piece. A hinge joint is formed between the clamping members, such that they are movable with respect to one another by turning around an axis of rotation of the hinge joint, extending perpendicularly to the second axis.

14 Claims, 3 Drawing Sheets

(58) Field of Classification Search
CPC ............ B23B 2205/12; B23B 2220/12; B23B 2220/126; B23B 2220/123; B23B 2260/126; B23B 27/007; B23B 27/1625; B23B 27/1659
See application file for complete search history.

(56) References Cited

U.S. PATENT DOCUMENTS

| | | | | |
|---|---|---|---|---|
| 4,080,854 A * | 3/1978 | Peterson | ................ | B23B 29/04 407/79 |
| 4,631,994 A * | 12/1986 | Jester | ..................... | B23B 29/04 407/75 |
| 4,780,029 A * | 10/1988 | Beck | ...................... | B23B 29/04 407/77 |
| 4,879,930 A * | 11/1989 | Von Haas | ............... | B23B 29/04 82/158 |
| 5,638,729 A * | 6/1997 | Flaherty | ................. | B23B 29/04 279/84 |
| 2009/0047077 A1 * | 2/2009 | Fielder | ................... | B23B 29/04 407/87 |
| 2009/0238651 A1 * | 9/2009 | Nguyen | ................. | B23B 29/04 407/104 |
| 2013/0170918 A1 * | 7/2013 | Hecht | .................. | B23B 27/045 407/110 |

* cited by examiner

TOOL BODY AND A TURNING TOOL FOR GROOVING OPERATIONS

RELATED APPLICATION DATA

This application is a § 371 National Stage Application of PCT International Application No. PCT/EP2016/064903 filed Jun. 28, 2016 claiming priority to EP 15185226.6 filed Sep. 15, 2015.

FIELD OF THE INVENTION

The present invention relates to a tool body for a turning tool intended for metal cutting grooving operations according to the preamble of claim 1 and to a turning tool according to claim 12. In particular, but not exclusively, the present invention relates to such tool bodies and tools that are suitable for use in face grooving operations.

BACKGROUND AND PRIOR ART

A turning tool used in grooving operations typically comprises a tool body and a detachable cutting insert clamped in the tool body by the use of tightening means. Such a tool body comprises a fitting member, such as a shaft, for fixing the tool onto a machine, such as a computer numerical control (CNC) machine or a turning lathe. It further comprises an upper and a lower clamping member on which inner seating surfaces are provided, defining an intermediate gap. The cutting insert is inserted in the intermediate gap between the seating surfaces and the tightening means is thereafter used to secure the cutting insert in the gap, with a rake face directed upward. For some grooving tools, including some face grooving tools, the tool body commonly has a major part of each inner seating surface extending transversely to a major extension of the fitting member, so that a major cutting edge of the cutting insert thereby extends in parallel to a long axis of the fitting member. Such face grooving tools commonly have a lower clamping member, which has a curvature corresponding to a predetermined groove diameter range. The cutting insert is thereby configured to cut a circular groove in a front end of a rotating work piece, which groove extends in a plane which is parallel to the major extension of the work piece, or extends parallel to a rotation axis of the work piece. Such a tool, having a fitting member in the form of a shank, is referred to as a 90° style shank tool. 90° style shank tools for face grooving are used in external face grooving where the machine in which the fixing member is fixed is configured such that 90° style shank tools are most suitable. For example, a tool revolver in a machine may be configured such that tools can only be fixed perpendicularly to the rotation axis of the work piece in which a groove is to be machined.

The tightening means may e.g. be in the form of a screw. By tightening the screw, the inner seating surfaces of the clamping members are pressed toward each other and thereby hold the cutting insert in a fixed position between the inner seating surfaces. In order to be able to move the inner seating surfaces of the clamping members toward one another to secure the cutting insert in the intermediate gap between the inner seating surfaces, a hinge joint around which the clamping members are turnable is commonly provided.

Tool bodies may advantageously be integrally formed in a unitary piece, comprising both the fitting member and the two clamping members. This type of tool body has an increased rigidity in comparison with tool bodies comprising separate parts, such as a tool body having a separate head end comprising the clamping members and a back end comprising the fitting member. Furthermore, the dimensional accuracy of the machined grooves is improved. The hinge joint is in this type of tool bodies in the form of an elastic material portion, which can be elastically deflected. Furthermore, tool bodies which are integrally formed in a unitary piece can be used effectively, e.g. with reduced leakage or pressure reduction, where a coolant fluid is supplied from the fitting member to one or both of the clamping members such that one or more coolant outlets are formed as close as possible to the active cutting edge, in order to effectively reduce the temperature of the cutting insert and to improve the chip breaking.

In integrally formed tool bodies intended for face grooving operations, the hinge joint is, for ease of manufacture, usually formed such that it extends in parallel to a major extension of the inner seating surface. When a cutting insert is mounted in the tool body, its major cutting edge thus has an extension which is perpendicular to said hinge joint. When clamped by the seating surfaces, the inventors of the present invention have found that the cutting insert has a tendency to rotate slightly around its long axis, extending in parallel with the hinge joint. This leads to incorrect dimensions of grooves created using the tool, and also to defective side surfaces of those grooves. For example, the groove width may have a smaller width than the width of the major cutting edge of the grooving insert. To overcome this problem, a balancing screw is commonly used to balance the forces, or to reduce the rotation of the cutting insert. However, the balancing screw is difficult to adjust since it needs to be on a correct level with respect to the cutting insert. If not, the load on the cutting insert will be unevenly distributed. Upon machining, this creates stress concentration in the hinge joint and may ultimately lead to fracture. Further, a balancing screw and a hole for such a balancing screw give a higher manufacturing cost of the tool.

SUMMARY OF THE INVENTION

It is a primary objective of the present invention to provide a tool body and a turning tool by means of which the above mentioned problems can be overcome. In particular, it is an objective to provide a tool body and a turning tool in which a stable and rigid clamping of a cutting insert can be achieved without the use of a balancing screw.

At least the primary objective is, according to a first aspect of the invention, achieved by means of a tool body as initially defined, which is characterised in that the axis of rotation of the hinge joint extends perpendicularly or substantially perpendicularly to said second axis along which the major part of the lower inner seating surface extends. By forming the hinge joint with this orientation, the problems associated with rotation of the cutting insert around its long axis are avoided or reduced. This means that it is possible to machine grooves with a better precision and with a better surface finish. The load distribution on the cutting insert is also improved thanks to the orientation of the hinge joint, and the risk of fractures in the hinge joint is thereby reduced.

The tool body thus is formed from a material having an inherent elasticity, e.g. steel, and has a shape which allows at least one of the clamping members, preferably the upper clamping member, to be moveable with respect to the other by turning around an axis of rotation, or an axis of pivotation, of the hinge joint. In other words, at least one of the clamping members, preferably the upper clamping member, is turnable or pivotable around the hinge joint.

The fitting member is suitable for fixing the tool directly or indirectly, e.g. by an intermediate adaptor, to a machine. The fitting member can have a square shaped or a rectangular shaped cross section. The fitting member can also comprise a connection or interface portion such as ISO/DIS standard 26623, which comprises a polygon taper and a flange contact surface.

For the purpose of definition, the upper clamping member comprises an upper inner seating surface configured to rest against an upper side of a cutting insert, said upper side comprising a cutting edge and a rake face. The lower clamping member comprises a lower inner seating surface configured to rest against a bottom side of the cutting insert, which bottom side is inactive in a machining operation.

By "substantially perpendicular" is here intended an angle which is 90°±3°. By "substantially parallel" is intended an angle which is 0°±3°.

The major part of each inner seating surface is here to be understood as that part of the inner seating surface that has the greatest length. In relation to the hinge joint, the lower clamping member preferably extends to a greater distance than the upper clamping member.

According to one embodiment, the axis of rotation of the hinge joint extends in parallel or substantially in parallel to the longitudinal first axis. The hinge joint in this way also extends in a direction which is parallel, or substantially parallel, to a major cutting edge of a cutting insert mounted between the inner seating surfaces. This improves the load distribution on the cutting insert during machining operations.

According to one embodiment, the intermediate gap comprises a front portion located between said inner seating surfaces and a rear portion located between the hinge joint and said front portion. Thus, the hinge joint is located at a distance greater than zero behind the seating surfaces. In this way, the clamping force holding the cutting insert in place between the inner seating surfaces can be increased. The intermediate gap preferably extends from a front opening of the intermediate gap to the hinge joint. The intermediate gap thus has an extension from a rear end, adjacent to the hinge joint, to a front end.

According to one embodiment, said rear portion is formed completely or at least partly above an upper surface of the fitting member, such that the hinge joint is located above said upper surface. In other words, the fitting member extends from the lower clamping member, while the upper clamping member is located on a higher level than an extension of the upper surface of that part of the fitting member which is closest to the clamping members. This makes the tool body with the hinge joint easier to manufacture, since a relatively thin material portion is needed to form the hinge joint. In this way, the hinge joint can be formed without having to make any groove or depression in the upper surface of the fitting member close to the hinge joint in order to achieve the thin material portion. Preferably, said rear portion is formed or is located completely above an extension of the upper surface of the fitting member. Preferably, the lower insert seating surface is formed or located completely below an extension of the upper surface of the fitting member.

According to one embodiment, said rear portion extends at least partly above said front portion and is inclined upward toward the hinge joint with respect to the second axis along which the major part of the lower inner seating surface extends. In this way, the intermediate gap can be formed in a milling operation without damaging the fitting member, in particular when the fitting member has a flat upper surface extending along the longitudinal first axis.

According to one embodiment, said rear portion extends at least partly above said front portion and is inclined upward from a side opening of the intermediate gap and toward the fitting member with respect to the longitudinal first axis. This is advantageous when the intermediate gap is to be formed by milling and prevents undesired machining of the fitting member.

According to one embodiment, a cylindrical cavity is formed at a rear end of said gap and extending along the axis of rotation of the hinge joint. The cylindrical cavity thus has an axis of rotation extending in parallel to the axis of rotation of said hinge joint. The cylindrical cavity relieves stress in the hinge joint and thus prevents fractures. The cylindrical cavity is an empty cavity, i.e. no element is located inside the cylindrical cavity.

According to one embodiment, said upper clamping member comprises a clamping finger, or a clamping jaw, on which its inner seating surface is provided. The clamping finger extends from the tool body and enables the formation of deep grooves.

According to one embodiment, the lower clamping member comprises a curved support section extending below the inner seating surface of said lower clamping member. This renders the tool body useful for use in a face grooving tool. It is desirable that the support section has a radius of curvature similar to that of the face groove which is to be cut. In this way, the support section can protrude with the cutting insert into the groove being cut. By means of the curved support section, it is thus possible to achieve a superior mechanical strength in comparison with e.g. tool bodies having a thin support section below the lower inner seating surface. Preferably, also the upper clamping member is formed with the same radius of curvature. The curved support section preferably has a radius of curvature which is more than 25.0 mm and less than 300.0 mm.

According to one embodiment, the tool body comprises a head portion comprising the upper and lower clamping members and the hinge joint, which head portion has an extension parallel to the longitudinal first axis which is smaller than its extension parallel to said second axis along which the major part of the lower inner seating surface extends. This makes the tool body more stable and less prone to vibrate during machining.

According to one embodiment, the fitting member is in the form of a shank. Preferably, the fitting member has a flat upper surface. The shank can e.g. have a rectangular cross section as taken across the longitudinal first axis, such as a square cross section. The fitting member may have a square-shaped or rectangular shaped cross section, or may comprise a connection or interface portion such as ISO/DIS standard 26623, which comprises a polygon taper and a flange contact surface. Also in this case, the fitting member extends along the longitudinal first axis.

According to a second aspect of the present invention, at least the above mentioned primary objective is achieved by means of a turning tool as initially defined, which is characterised in that it comprises the proposed tool body, a tightening means and a cutting insert positioned between the inner seating surfaces by means of the tightening means. Advantages and advantageous embodiments of such a turning tool correspond to those discussed in connection with the proposed tool body. The turning tool preferably comprises a cylindrical cavity at a rear end of the intermediate gap, which cylindrical cavity is an empty cavity, i.e. no element is located inside the cylindrical cavity.

According to one embodiment, the cutting insert has a major cutting edge extending parallel to or substantially parallel to the longitudinal first axis of the fitting member. The major cutting edge preferably has a width of 2.0-10.0 mm.

According to one embodiment, the tightening means is arranged in a region which along said longitudinal first axis is located between the cutting insert and the fitting member. The tightening means is thus located beside the cutting insert, and not behind the cutting insert along the second axis, such as between the cutting insert and the hinge joint. This makes it possible to make a shorter clamping finger, and moreover, the tightening means does not interfere with a coolant channel which may be provided in the clamping finger. Preferably, the tightening means is located at a distance greater than zero from the inner seating surfaces.

Further advantageous features and advantages of the invention will appear from the following detailed description.

BRIEF DESCRIPTION OF THE DRAWINGS

The invention will in the following be described by means of example with reference to the appended drawings, in which.

DETAILED DESCRIPTION OF EMBODIMENTS OF THE INVENTION

Figure 1:
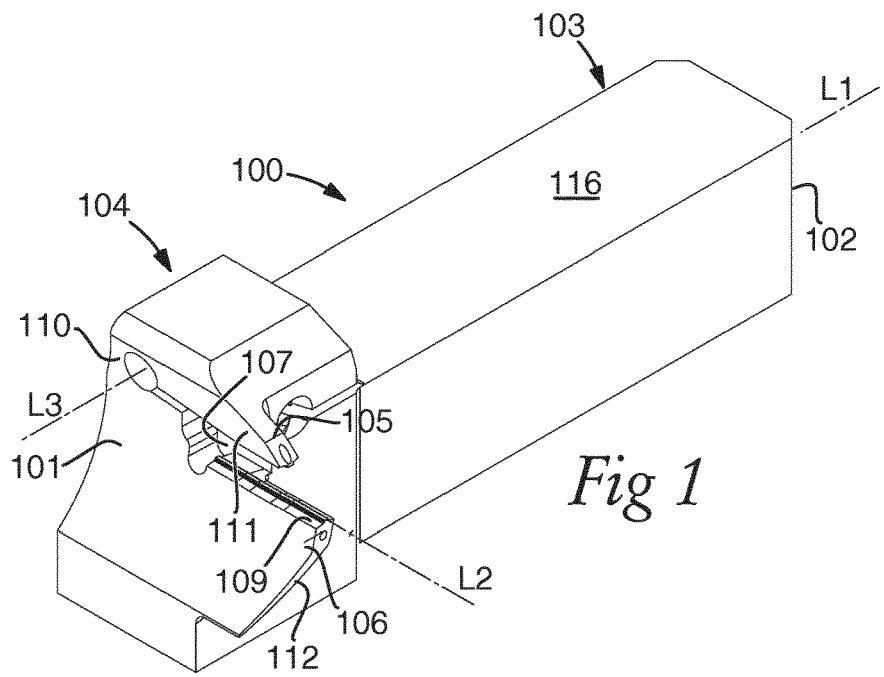
FIG. 1 is a perspective view showing a tool body according to an embodiment of the invention.
Figure 2:
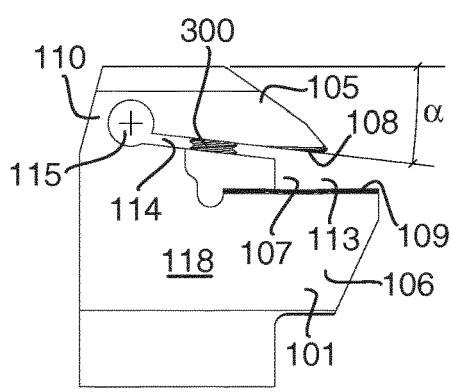
FIG. 2 is a front view of the tool body in FIG. 1.
Figure 3:
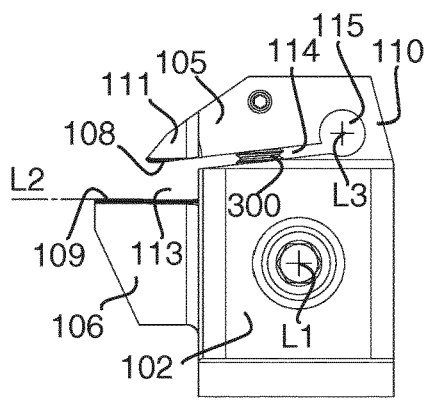
FIG. 3 is rear view of the tool body in FIG. 1.
Figure 4:
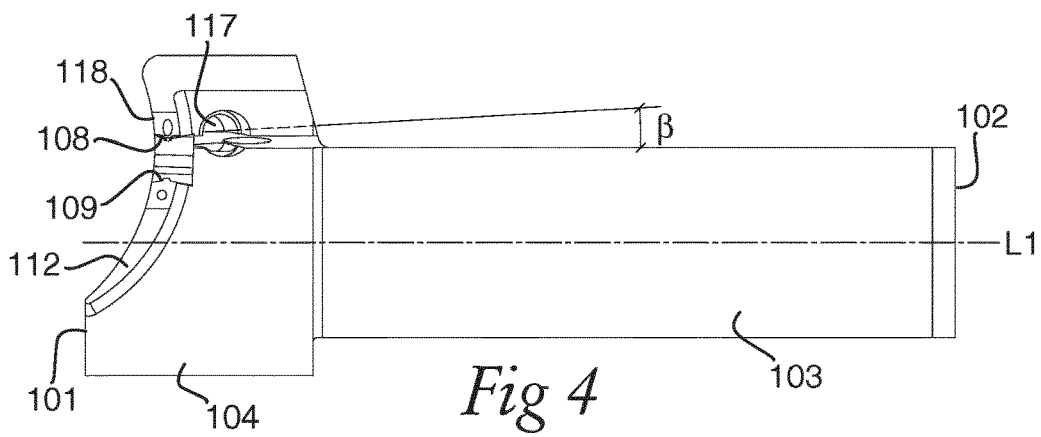
FIG. 4 is a side view of the tool body in FIG. 1.

A tool body 100 according to an embodiment of the invention is shown in FIG. 1-4. The tool body 100 is intended for a turning tool to be used in face grooving operations. It has a head end 101 and a back end 102 between which a longitudinal first axis L1 extends. It comprises a fitting member in the form of a shank 103 extending along the first longitudinal axis L1 for fixing the tool body 100 to a machine (not shown) at the back end 102 of the tool body. The shank 103 has a rectangular cross section with a flat upper surface 116. At the head end 101 of the tool body 100, a head portion 104 configured for holding a cutting insert is provided. The head portion 104 comprises an upper clamping member 105 and a lower clamping member 106. The entire tool body 100, including the shank 103 and the clamping members 105, 106, is formed in a unitary piece. The tool body is manufactured from steel or another material having an inherent elasticity.

On the upper clamping member 105, a clamping finger 111 is provided. An upper inner seating surface 108 is located on the clamping finger 111. On the lower clamping member 106, a lower inner seating surface 109 facing the upper inner seating surface 108 is provided. Below the lower inner seating surface 109, a curved support section 112 extends. The curved support section 112 is curved around an axis which is parallel to the second axis L2. The curvature depends on the groove diameter range which the tool body is intended for. The curved support section 112 may be directed away from the back end 102 of the tool body, as shown, or alternatively toward the back end of the tool body.

The inner seating surfaces 108, 109 are spaced apart by an intermediate gap 107 in which an elongated cutting insert is insertable. The lower inner seating surface 109 extends primarily, i.e. has its longest extension, along a second axis L2, which is perpendicular or substantially perpendicular to the longitudinal first axis L1 along which the shank 103 extends. The clamping members 105, 106 are configured to be movable toward one another by means of a tightening means in order to secure the cutting insert in the intermediate gap 107 between the inner seating surfaces 108, 109. A hinge joint 110 is formed between the clamping members 105, 106 at a rear end of the intermediate gap 107. The hinge joint 110 is the only part of the head portion 104 that holds the clamping members 105, 106 together. Thanks to the inherent elasticity of the material of the tool body 100, the hinge joint 110 can be elastically deflected. The clamping members 105, 106 are thereby movable with respect to one another by turning around an axis of rotation (not shown) of the hinge joint 110. The axis of rotation of the hinge joint 110 extends perpendicularly, or substantially perpendicularly, to said second axis L2 along which the lower inner seating surface 109 extends.

The intermediate gap 107 in the shown embodiment comprises a front portion 113 located between the inner seating surfaces 108, 109 and a rear portion 114 located between the front portion 113 and the hinge joint 110. At the very rear end of the intermediate gap 107, a cylindrical cavity 115 is formed, extending with a longitudinal axis L3 parallel to the longitudinal first axis L1 and the axis of rotation of the hinge joint 110. The cylindrical cavity 115 and the rear portion 114 are located laterally above the upper surface 116 of the shank 103 and reach all the way through the head portion 104 of the tool body.

The rear portion 114 of the intermediate gap 107 is narrower than the front portion 113, i.e. the distance between the clamping members 105, 106 is smaller at the rear portion 114. The rear portion 114 is inclined at an angle α upward toward the hinge joint 110 and the cylindrical cavity 115 with respect to the second axis L2 along which the lower inner seating surface 109 extends, as seen in the planar side view shown in FIG. 2. In the shown embodiment, the angle α is approximately 6°, but may be varied as long as it allows the intermediate gap 107 to be formed in a milling operation without damaging the shank 103. The rear portion 114 is also inclined at an angle β with respect to the longitudinal first axis L1 in such a way that a part of the rear portion 114 located directly behind the inner seating surfaces 108, 109, close to a side surface 118 of the tool body 100, is positioned at a lower level than a part of the rear portion 114 located closer to the shank 103. In the shown embodiment, the angle β is approximately 1.5°, but may be varied as long a s it allows the intermediate gap 107 to be formed in a milling operation without damaging the shank 103.

Figure 5:
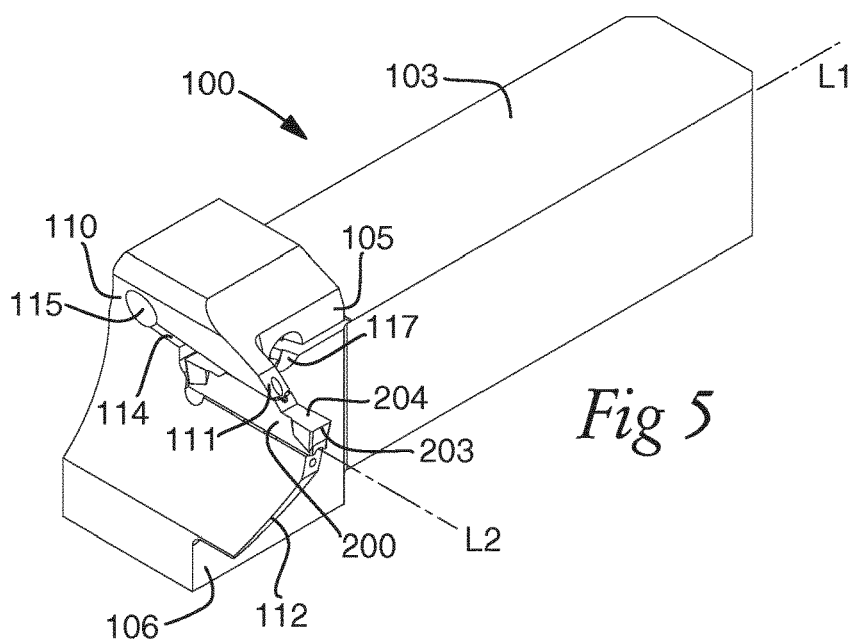
FIG. 5 is a perspective view showing a turning tool according to an embodiment of the present invention.
Figure 6:
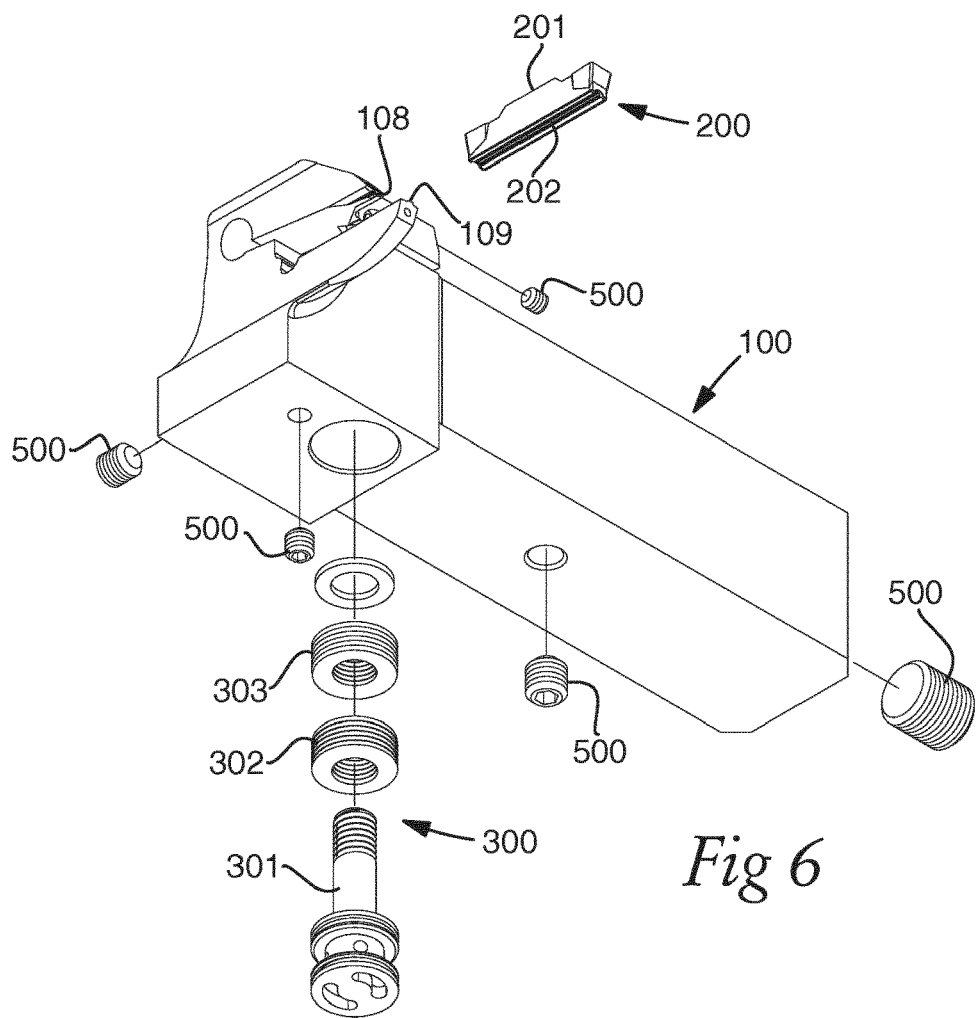
FIG. 6 is an exploded view of the turning tool in FIG. 5.

A turning tool according to the invention is shown in FIG. 5-6. The turning tool is configured for face grooving. In a tool body 100 as shown in FIG. 1-4, a cutting insert 200 is secured using a tightening means 300 to clamp the cutting insert 200 between the inner seating surfaces 108, 109 of the tool body 100, in the front portion 113 of the intermediate gap 107. The cutting insert 200 has an elongated shape and is indexable with two index positions. In other words, the cutting insert can be rotated to two different cutting positions. When mounted in one of the index positions as shown in the figures, it has an upper side 201 resting against the upper inner seating surface 108 and a lower side 202 resting against the lower inner seating surface 109. The upper side comprises a major cutting edge 203 and a rake face 204. The major cutting edge 203 extends in parallel to the longitudinal first axis L1 of the tool body 100. The cutting insert 200, when mounted, is in contact with a rear stopping surface located at a rear end of the front portion 113 of the intermediate gap 107. A clearance is provided behind the inactive cutting edge.

In the shown embodiment, the tightening means 300 is in the form of a tightening mechanism which is described in detail in EP2703104. It comprises a screw 301 configured to extend through the lower clamping member 106 and up into the upper clamping member 105 in a direction which is transverse to the longitudinal first axis L1 as well as to the second axis L2. It further comprises compression spring members 302, 303 through which the screw 301 extends when mounted. By adjusting the screw 301, the cutting insert 200 can be clamped between the clamping members 105, 106 with a desirable force. The cutting insert can be easily released by means of a releasing member, such as a torsion rod (not shown) which is inserted into a recess 117 formed in the tool body. By turning the releasing member, the spring force from the compression spring members 302, 303 can be overcome and the intermediate gap 107 held open. In this way, it is possible to release the cutting insert 200 and insert a new one without having to adjust the screw 301 and thereby the clamping force holding the cutting insert. Further details, embodiments and advantages of such a tightening mechanism suitable for the turning tool according to the present invention are described in EP2703104.

In the tool according to the present invention, the tightening means may be any suitable tightening means that can be used to clamp the clamping members 105, 106 together. Such tightening means can be e.g. a screw mechanism such as a bolt or a screw or the like. Preferably, the tightening means is located in a region which in a direction parallel with the longitudinal first axis L1 is located between the inner seating surfaces 108, 109 and the shank 103, i.e. between the cutting insert 200 and the fitting member.

The turning tool in the shown embodiment also comprises several connections 500 for coolant and internal channels through which coolant may pass. With the shown tightening means 300, the screw 301 is provided with a coolant channel (not shown) allowing for passage of coolant through both of the clamping members 105, 106 via the screw 301.

Figure 7:
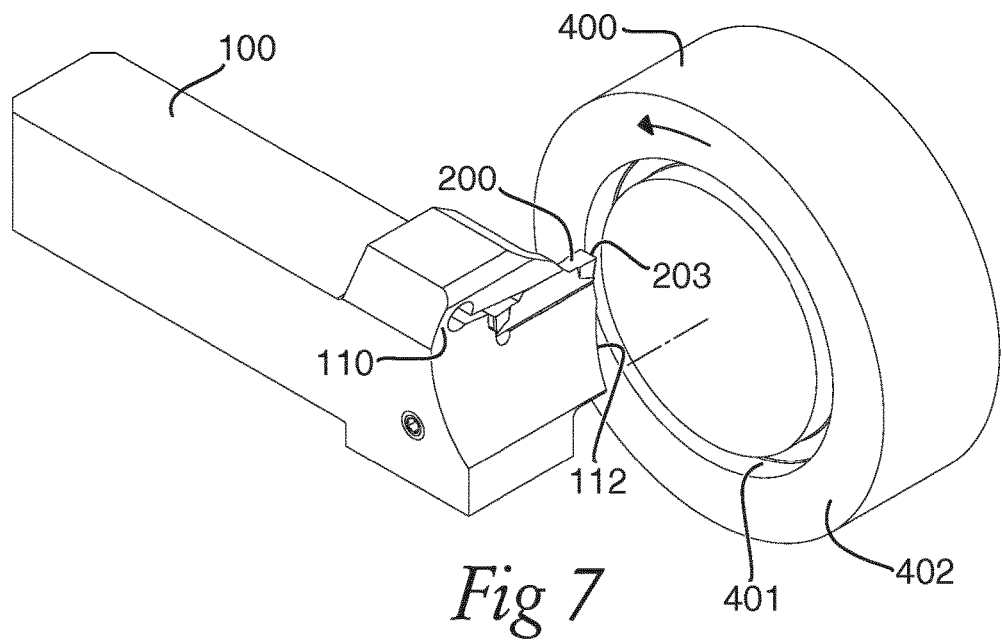
FIG. 7 is a perspective view schematically showing the turning tool in FIG. 5 during a face grooving operation.
Figure 8:
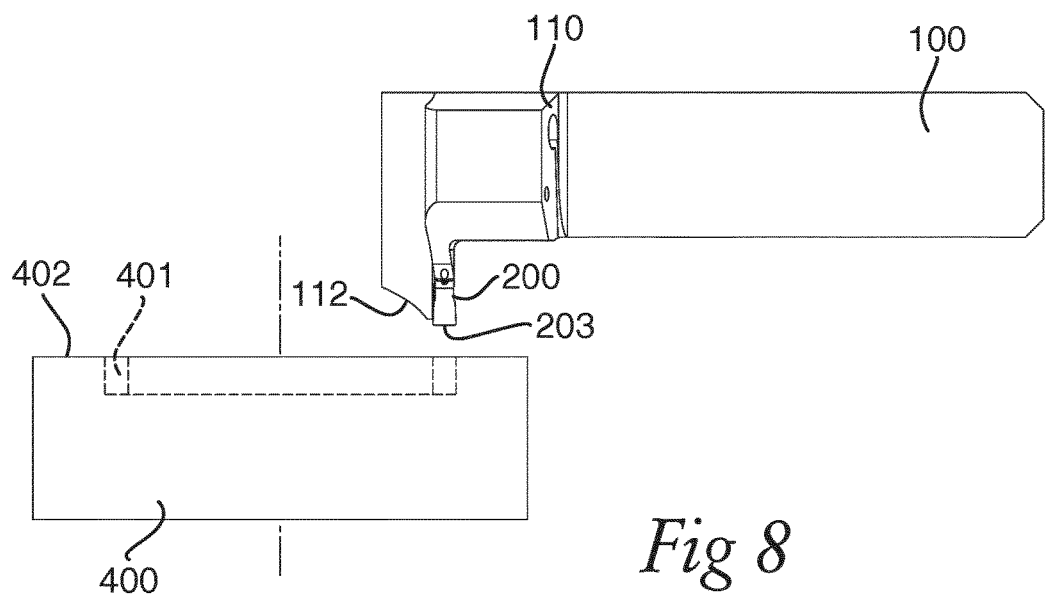
FIG. 8 is a top view of the turning tool in FIG. 7.

A turning tool according to an embodiment of the invention used in a face grooving operation on a rotating workpiece 400 is schematically shown in FIG. 7-8. It can be seen that the major cutting edge 203 of the cutting insert 200 forms the bottom of a groove 401 in a front end 402 of the workpiece 400. The curved support section 112 of the tool body 100 lies behind the cutting insert 200 in the rotating groove 401. Thanks to the orientation of the hinge joint 110, the cutting forces exerted on the cutting insert 200 during the grooving operation are distributed evenly on the hinge joint 110 extending in parallel with the major cutting edge 203.

The invention is of course not limited to the embodiments disclosed, but may be varied and modified within the scope of the following claims.

The invention claimed is:

1. A tool body for a turning tool configured for grooving operations, the tool body comprising:
    a fitting member arranged to fix the tool body to a machine, the fitting member extending along a longitudinal first axis;
    upper and lower clamping members, each of the members having respective inner seating surfaces facing one another and separated by an intermediate gap in which an elongated cutting insert is insertable, the cutting insert having a rake face on an upper side and a bottom side facing the inner seating surface of the lower clamping member, wherein a major part of said lower inner seating surface extends along a second axis perpendicular to the longitudinal first axis, wherein said upper and lower clamping members are configured to be movable toward one another by a tightening device in order to secure the cutting insert in the intermediate gap between the inner seating surfaces, wherein the fitting member and the clamping members are integrally formed in a unitary piece; and
    a hinge joint formed between the upper and lower clamping members, at least one of the upper and lower clamping members being movable with respect to the other by turning around an axis of rotation of the hinge joint, wherein the axis of rotation of the hinge joint extends perpendicularly to the second axis along which the major part of the lower inner seating surface extends.

2. The tool body according to claim 1, wherein the axis of rotation of the hinge joint extends in parallel or substantially in parallel to the longitudinal first axis.

3. The tool body according to claim 1, wherein the intermediate gap includes a front portion located between said inner seating surfaces and a rear portion located between the hinge joint and said front portion.

4. The tool body according to claim 3, wherein said rear portion is formed completely or at least partly above an upper surface of the fitting member, such that the hinge joint is located above said upper surface.

5. The tool body according to claim 4, wherein said rear portion extends at least partly above said front portion and is inclined upward toward the hinge joint with respect to the second axis along which the major part of the lower inner seating surface extends.

6. The tool body according to claim 4, wherein said rear portion extends at least partly above said front portion and is inclined upward from a side opening of the intermediate gap and toward the fitting member with respect to the longitudinal first axis.

7. The tool body according to claim 1, wherein a cylindrical cavity is formed at a rear end of said intermediate gap and extends along the axis of rotation of the hinge joint.

8. The tool body according to claim 1, wherein said upper clamping member includes a clamping finger on respective inner seating surface is provided.

9. The tool body according to claim 1, wherein the lower clamping member includes a curved support section extending below the inner seating surface of said lower clamping member.

10. The tool body according to claim 1, further comprising a head portion that includes the upper and lower clamping members and the hinge joint, the head portion having an extension parallel to the longitudinal first axis which is smaller than its extension parallel to said second axis along which the major part of the lower inner seating surface extends.

11. The tool body according to claim 1, wherein the fitting member is in the form of a shank.

12. A turning tool configured for grooving operations, comprising:
    a tool body including a fitting member arranged to fix the tool body to a machine, the fitting member extending along a longitudinal first axis, and upper and lower clamping members, each of the members having respective inner seating surfaces facing one another and separated by an intermediate gap in which an elongated cutting insert is insertable, the cutting insert having a rake face on an upper side and a bottom side facing the inner seating surface of the lower clamping member, wherein a major part of the lower inner seating surface extends along a second axis perpendicular to the longitudinal first axis, wherein the upper and lower clamping members are configured to be movable toward one another by a tightening device in order to secure the cutting insert in the intermediate gap between the inner seating surfaces, wherein the fitting member and the clamping members are integrally formed in a unitary piece, the tool body having a hinge joint formed between the upper and lower clamping members, at least one of the upper and lower clamping members being movable with respect to the other by turning around an axis of rotation of the hinge joint, wherein the axis of rotation of the hinge joint extends perpendicularly to the second axis along which the major part of the lower inner seating surface extends;

a tightening means; and a cutting insert positioned between the inner seating surfaces by means of the tightening device.

13. The turning tool according to claim 12, wherein the cutting insert has a major cutting edge extending parallel to or substantially parallel to the longitudinal first axis of the fitting member.

14. The turning tool according to claim 12, wherein the tightening device is arranged in a region which along the longitudinal first axis is located between the cutting insert and the fitting member.

* * * * *